United States Patent [19]

Tuttle

[11] Patent Number: 5,725,967
[45] Date of Patent: Mar. 10, 1998

[54] BATTERY CONTAINER AND METHOD OF MANUFACTURE

[75] Inventor: Mark E. Tuttle, Boise, Id.

[73] Assignee: Micron Communications, Inc., Boise, Id.

[21] Appl. No.: 823,250

[22] Filed: Mar. 24, 1997

Related U.S. Application Data

[63] Continuation of Ser. No. 515,128, Aug. 15, 1995, abandoned.

[51] Int. Cl.⁶ .................................................. H01M 2/02
[52] U.S. Cl. ......................... 429/185; 429/171; 429/172; 429/173; 429/174
[58] Field of Search .......................... 429/171, 172, 429/173, 174, 185

[56] References Cited

U.S. PATENT DOCUMENTS

| | | | |
|---|---|---|---|
| 2,837,593 | 6/1958 | Rueger | 429/174 |
| 3,068,313 | 12/1962 | Daley | 429/174 |
| 3,258,369 | 6/1966 | Blaich | 429/195 |
| 3,791,874 | 2/1974 | Koehler | 136/173 |
| 3,945,846 | 3/1976 | Dey | 429/172 |
| 4,608,323 | 8/1986 | Zaborney | 429/167 |
| 4,615,959 | 10/1986 | Hayashi et al. | 429/194 |
| 4,623,599 | 11/1986 | Vourlia | 429/185 |
| 4,627,417 | 12/1986 | Von Der Becke et al. | 126/369 |
| 4,963,161 | 10/1990 | Chi et al. | 29/623.5 |
| 5,114,808 | 5/1992 | Chaney, Jr. et al. | 429/172 |
| 5,246,795 | 9/1993 | Megahed et al. | 429/185 |

OTHER PUBLICATIONS

Rombauer et al., "Joy of Cooking", Bobbs–Merrill Company, p. 803, Apr. 1981.

*Primary Examiner*—Prince Willis, Jr.
*Assistant Examiner*—Carol Chaney
*Attorney, Agent, or Firm*—Stephen A. Gratton

[57] ABSTRACT

A container for a battery and a method for manufacturing such a container are provided. The container includes a housing; a cover adapted for attachment to the housing by crimping; and a gasket crimped to the cover and housing. One or more grooves are formed in the housing or cover or both. During assembly, the gasket is positioned between the cover and the housing, and a portion of the cover and a portion of the housing are crimped together causing the gasket to flow into and conform to the shape of the grooves. Placement of the gasket within the grooves increases the surface area of the resultant seal thereby improving the seal quality without significantly increasing the thickness of the battery or cell. In addition the grooves prevent the gasket from flowing out of the crimped seam and help to maintain the crimp pressure throughout the lifetime of the battery.

14 Claims, 2 Drawing Sheets

BATTERY CONTAINER AND METHOD OF MANUFACTURE

CROSS REFERENCE TO RELATED APPLICATIONS

This application is a continuation of application Ser. No. 08/515,128, filed Aug. 15, 1995, and now abandoned.

FIELD OF INVENTION

The present invention relates to a battery container and to a method of manufacturing the same. More specifically, the present invention relates to a container for a battery having an improved seal adapted to achieve a fluid tight seal between components of the container.

BACKGROUND OF THE INVENTION

Microelectronic components, i.e., integrated circuits, are presently used as component parts in a wide variety of electronic devices, for example calculators, watches, organizers, cordless telephones, radios and tape recorders. The portability of such devices has created the need for miniature power cells which must produce increased energy per unit volume and superior discharge characteristics over conventional batteries. This need has led to the development of relatively thin batteries which are constructed with an alkali metal anode, a non-aqueous electrolyte and cathodes which are constructed of non stoichiometric compounds. Lithium is an especially suitable material for construction of the anode due to its relatively low molecular weight and high electronegativity. Such thin, batteries can be made with a high energy density, a long shelf life and to operate efficiently over a wide temperature range.

These thin, batteries are conventionally constructed in the form of a container referred to as a coin cell. The container includes a cylindrical housing (or can) and a lid (or cover) which are typically formed of nickel plated stainless steel. Typically such a battery is assembled by assembling the anode, separator, electrolyte and cathode components of the battery with the lid and then crimping the lid and housing together with a gasket therebetween. As thus assembled, the housing is in electrical contact with the cathode of the battery and the lid with the anode.

In the manufacture of coin cells, it is important to seal the cell to the atmosphere to inhibit deleterious reactions which decrease the useful cell life, for example, the reaction of lithium with water vapor or oxygen. This seal also functions to inhibit the escape of the electrolyte from the cell. Gaskets, such as injection molded polypropylene, have been employed to form a fluid tight seal between the lid and housing of a cell. However, the pressure exerted upon the gasket during the mechanical process of crimping the cell lid and housing together causes the gasket material to flow along the smooth surfaces of the housing and/or lid to relieve the pressure exerted thereon. The flow of gasket material during assembly of the cell may cause the gasket material to be non uniformly displaced thereby resulting in leaks and a shorted cell life.

OBJECTS OF THE INVENTION

In view of the foregoing there is a need in the art for improved containers and improved methods for forming containers for solid state batteries, such as coin or button cells.

Accordingly, it is an object of the present invention to provide a method for forming a container for a battery with an improved seal which significantly reduces the occurrence of leaks, and therefore, increases the useful life of the battery.

It is a further object of the present invention to provide an improved container for a battery, such as a coin or button cell, which has an improved seal without a significantly increased thickness.

Other objects, advantages and capabilities of the present invention will become more apparent as the description proceeds.

SUMMARY OF THE INVENTION

In accordance with the present invention, an improved container for a battery and a method for manufacturing the container are provided. The container includes a housing, a cover and a gasket secured to one another with a crimped seam. The gasket comprises a compressible material, such as a polymeric material, placed between the housing and the cover to form a gas-tight and fluid-tight seal. Either the housing or the cover (or both) include one or more grooves adapted to increase the surface area of the seal and to eliminate a straight line leakage path through the seal. In addition the grooves help to maintain the pressure of the crimped seam and to prevent the flow of the gasket material from the seam.

The method for forming the container, generally stated, includes the steps of: forming a housing; forming a cover; forming one or more grooves in the housing or in the cover; positioning a compressible gasket between the cover and the housing; and then crimping the cover, housing and gasket together thereby causing the gasket to deform into the grooves to form a seal.

DETAILED DESCRIPTION OF THE INVENTION

Figure 1:
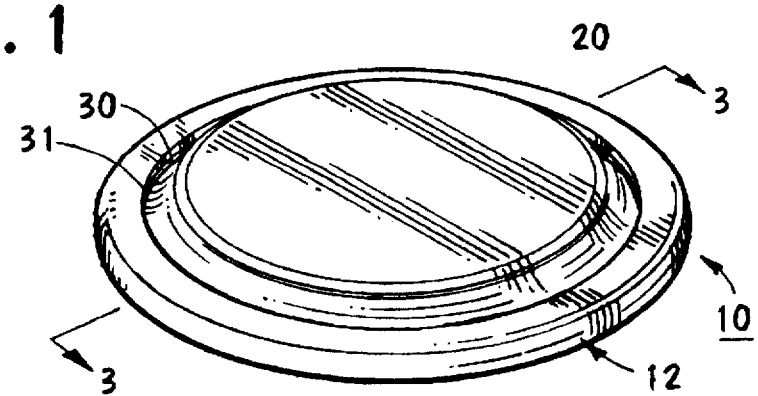
FIG. 1 is a perspective view of a container constructed in accordance with the present invention for a coin or button cell battery.

Referring to FIG. 1, a container 10 for a coin or button cell battery is illustrated. The container 10 includes a housing 12, a cover 20 and a gasket 30. These components are secured to one another with a crimped seam 31 in a manner described below.

In the illustrative embodiment, the container 10 has a generally circular peripheral configuration and has a thickness that is much less than a diameter thereof. However, it will be evident to one skilled in the art that other peripheral configurations, such as triangular, rectangular or hexagonal, can be employed in lieu of a generally circular configuration. Furthermore, although illustrated as a relatively thin structure, the container 10 of the present invention can be formed in a cylindrical shape with a thickness greater than the diameter thereof.

Figure 2:
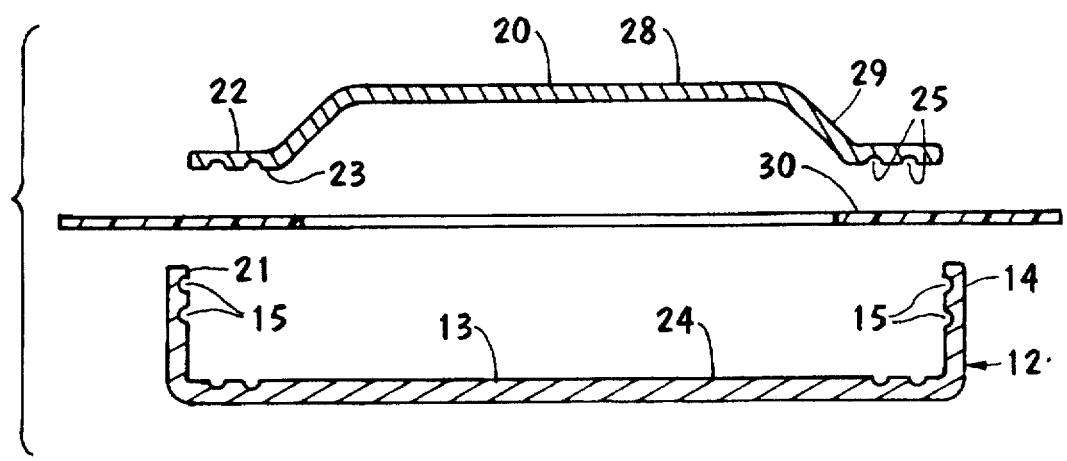
FIG. 2 is an exploded, sectional view with parts removed of the container shown in FIG. 1.

Referring now to FIG. 2, components of the container 10 are shown in an exploded view. For simplicity, components of the battery, such as the anode, cathode, separator and electrolyte, are not shown. The housing 12 can be described as a can, case or cantina adapted to house the components of a battery. The housing 12 can be formed by bending, stamping or shaping a single piece of material. The housing 12 includes a generally circular shaped bottom portion 13 and an integrally formed annular sidewall portion 14. The housing 12 is sized to have anode, cathode, separator, and electrolyte components of a battery retained therein in a manner that is well known in the art.

An inner surface 21 of the sidewall portion 14 of the housing 12 has at least one, and preferably a plurality of grooves 15 formed therein. In addition, an inner surface 24 of the bottom portion 13 of the housing 12 includes at least one and preferably a plurality of grooves 15 formed therein. These grooves 15 can also be described as channels or striations. The grooves 15 can be formed by stamping or scribing and are preferably planar and concentric to one another. Furthermore, the grooves 15 can be formed with a rounded profile as shown, or with sharper corners (not shown). Moreover, the grooves 15 can be formed prior to bending and shaping of the housing 12 or can be formed after bending and shaping using suitable tooling.

Still referring to FIG. 2, the cover 20 for the container 10 is formed from a single piece of material and includes an annular shaped outer portion 22, a raised internal portion 28 and an annular shoulder 29 therebetween. The cover 20 has a generally circular peripheral configuration that approximates the circular peripheral configuration of the housing 12. The cover 20 can be formed of any suitable material, for example nickel clad stainless steel. In addition, the cover 20 can by formed by any suitable process such as by stamping, or spinning and forming, a flat piece of material. An inner face 23 of the annular outer portion 22 of the cover 20 includes at least one, and preferably a plurality of grooves 25 therein. The grooves 25 are substantially similar to the grooves 15 formed in the housing 12 and can also be described as channels, or striations. The grooves 25 can be formed by stamping or scribing the cover 20, such as with a diamond scribe.

Figure 3:
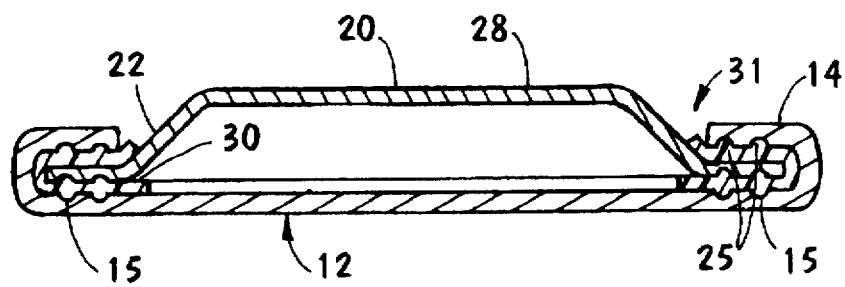
FIG. 3 is a cross sectional view taken along line 3—3 of FIG. 1.

The grooves 25 in the cover 20 and the grooves 15 in the housing 12 are positioned to contact the gasket 30 during assembly of the container 10 to form a gas-tight and fluid-tight seal. As illustrated in FIG. 3, during assembly the gasket 30 is positioned between the cover 20 and the housing 12 and the crimped seam 31 is formed. The gasket 30 can be formed of any suitable compressible or resilient material such as a polymeric material. Suitable materials for forming the gasket include polypropylene. Additional sealants such as pitch may be applied to the stainless steel or to the gasket 15 to improve the seal.

During the crimping process, the outer annular portion 22 of the cover 20 is folded over upon itself as the free end of sidewall 14 of housing 12 is folded inwardly over cover 20 to form the crimped seam 31. The pressure exerted upon the gasket 30 during this crimping process causes the gasket material to flow or deform into the grooves 15 and 25. In this manner the pressure developed during the crimping process is maintained by the gasket 30. In addition, the gasket material is prevented from flowing away from the crimped seam 31 by the grooves 15 and 25. The grooves 15 and 25 thus help to secure the gasket 30 to the cover 20 and to the housing 14 and to also secure the cover 20 and the housing 14 to one another by maintaining the pressure exerted by the crimping process.

The grooves 15 and 20 also increase the total surface area of the resultant seal. This improves the quality of the seal by inhibiting gas or fluid flow in a straight line path into or out of the container 10. This prevents the electrolyte from discharging from the container 10 and prevents air, water and other contaminants from entering the container 10.

Figure 4:
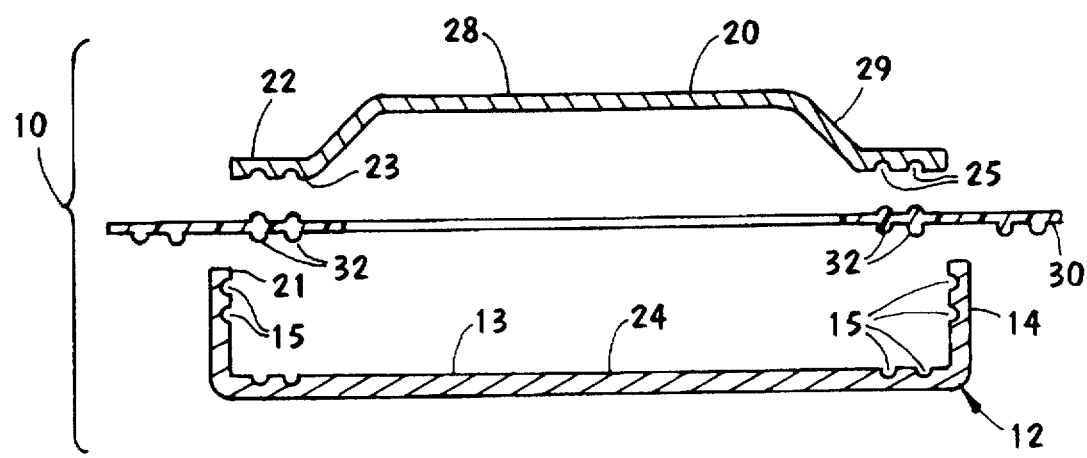
FIG. 4 is an exploded, sectional view of an alternate embodiment container constructed in accordance with the invention.

Although the housing and cover for a battery container could be formed with ridges or protuberances in lieu of grooves, it is preferred to utilize grooves in accordance with the present invention since ridges or protuberances would increase the cell thickness and the difficulty of manufacturing the same. However, as shown in FIG. 4, the gasket 30 can be formed with ridges 32 or protuberances for mating engagement with the grooves 15 in the housing 12 and the grooves 25 in the cover 20. Such a configuration would conform the shape of the gasket 30 to the grooves 15 and 25 to form an improved gas and fluid-tight seal.

It is within the scope of the present invention that the housing 12 or cover 20 include from one to hundreds of grooves 15 and 25. Furthermore, although the grooves 15 and 25 have been illustrated as being continuous, it is within the scope of the present invention to form discontinuous grooves. Such discontinuous grooves could be staggered and include discontinuities between adjacent grooves to inhibit the development of straight line leaks.

Furthermore, although the process of the present invention has been described for manufacturing containers for coin or button cell batteries, it will be evident to a skilled artisan that the process of the present invention can be utilized to form improved gas-tight and fluid-tight seals in other batteries or cells, such as for example cylindrical crimped batteries.

Thus the invention provides an improved battery container and a method of manufacturing same so as to inhibit leakage of electrolyte out of and contaminants into the battery or cell. Furthermore, although the method of the invention has been described with reference to certain preferred embodiments, as will be apparent to those skilled in the art, certain changes and modifications can be made without departing from the scope of the invention as defined by the following claims.

I claim:

1. A battery container comprising:
    a housing for mounting battery components therein, said housing including a portion with a first groove formed therein;
    a cover configured for mating engagement with the housing, said cover including a portion with a second groove formed therein;
    a gasket placed between the housing and the cover; and
    a crimped seam comprising the portion of the housing folded over the portion of the cover with a pressure therebetween and with the gasket deformed within the first and second grooves to form a seal and maintain the pressure.

2. The battery container as claimed in claim 1 wherein the first groove comprises a first channel in the cover and the second groove comprises a second channel in the housing.

3. The battery container as claimed in claim 1 wherein the gasket includes a first ridge configured for mating engagement with the first groove and a second ridge configured for mating engagement with the second groove.

4. A battery container comprising;
    a circular housing comprising a surface having a first groove formed therein and a sidewall portion extending from the surface having a second groove formed therein;
    a circular cover comprising a third groove formed in an annular portion thereof, said cover configured for mating engagement with the housing;

a crimped seam comprising the sidewall portion of the housing folded over the annular portion of the cover;

a seal within the crimped seam comprising a gasket deformed within the first, second and third grooves to maintain a pressure of the seam.

5. The battery container as claimed in claim 4 wherein the housing includes a plurality of first grooves and a plurality of second grooves, and the cover includes a plurality of third grooves.

6. The battery container as claimed in claim 4 wherein the gasket includes a plurality of ridges configured for mating engagement with the first, second and third grooves.

7. The battery container as claimed in claim 4 wherein the first groove comprises a channel formed in the surface.

8. The battery container as claimed in claim 4 wherein the housing includes a plurality of substantially concentric first grooves and a plurality of substantially concentric second grooves.

9. The battery container as claimed in claim 4 wherein the cover includes a plurality of concentric third grooves.

10. A method for manufacturing a battery container comprising:

forming a housing comprising a portion with a plurality of channels formed therein, said housing configured for mounting battery components therein;

forming a cover for attachment to the housing, said cover comprising a portion with a plurality of channels formed therein;

positioning a compressible gasket between the cover and the housing; and forming a crimped seam by folding the portion of the cover over the portion of the housing with the gasket conforming to a shape of the channels to maintain a pressure of the crimped seam.

11. The method as claimed in claim 10 wherein a surface of the housing includes a plurality of substantially concentric channels.

12. The method as claimed in claim 10 wherein the housing comprises a generally circular member and the portion of the housing comprises an annular sidewall.

13. The method as claimed in claim 10 further comprising forming the gasket with a plurality of ridges configured for mating engagement with the plurality of channels.

14. The method as claimed in claim 13 wherein the positioning step comprises aligning the plurality of ridges with the plurality of channels prior to forming the crimped seam.

\* \* \* \* \*